US008839314B2

(12) United States Patent  (10) Patent No.: US 8,839,314 B2
Kortum et al.                (45) Date of Patent:   Sep. 16, 2014

(54) DEVICE, SYSTEM, AND METHOD FOR MANAGING TELEVISION TUNERS

(71) Applicant: AT&T Intellectual Property I, L.P., Atlanta, GA (US)

(72) Inventors: Philip Ted Kortum, Austin, TX (US); Marc Andrew Sullivan, Austin, TX (US); Jeffrey Lewis Brandt, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/835,218

(22) Filed: Mar. 15, 2013

(65) Prior Publication Data

US 2013/0205351 A1  Aug. 8, 2013

Related U.S. Application Data

(63) Continuation of application No. 11/001,676, filed on Dec. 1, 2004, now Pat. No. 8,434,116.

(51) Int. Cl.
    *H04N 21/458* (2011.01)
    *H04N 21/436* (2011.01)
    *H04N 5/63*   (2006.01)
    *H04N 5/50*   (2006.01)

(52) U.S. Cl.
    CPC .............. *H04N 21/436* (2013.01); *H04N 5/50* (2013.01); *H04N 5/63* (2013.01)
    USPC .................. 725/80; 725/92; 725/93; 725/100

(58) Field of Classification Search
    CPC ................................................. H04N 21/4583
    See application file for complete search history.

(56) References Cited

U.S. PATENT DOCUMENTS

| 4,243,147 A | 1/1981  | Twitchell et al. |
| 4,356,509 A | 10/1982 | Skerlos et al.   |
| 4,768,926 A | 9/1988  | Gilbert, Jr.     |
| 4,820,167 A | 4/1989  | Nobles et al.    |
| 4,884,974 A | 12/1989 | DeSmet           |
| 4,888,819 A | 12/1989 | Oda et al.       |
| 4,907,079 A | 3/1990  | Turner et al.    |

(Continued)

FOREIGN PATENT DOCUMENTS

| WO | 9963759 A2 | 12/1999 |
| WO | 0028689 A2 | 5/2000  |

(Continued)

OTHER PUBLICATIONS

Hewes, J. "Transistor Circuits," Electronics Club, 2003, Kelsey Park School, Beckenham, United Kingdom, 8 pages.

(Continued)

*Primary Examiner* — Bennett Ingvoldstad

(74) *Attorney, Agent, or Firm* — Toler Law Group, PC

(57) ABSTRACT

A method at a first set top box includes transmitting to a second set top box a request to use a television tuner associated with the second set top box. The method further includes receiving a return recording option from the second set top box. The method also includes generating an indication of a rejection of the request from the second set top box based on the received return recording option. The indication includes a graphical message specifying the rejection of the request.

17 Claims, 6 Drawing Sheets

(56) References Cited

U.S. PATENT DOCUMENTS

| | | |
|---|---|---|
| 5,126,731 A | 6/1992 | Cromer, Jr. |
| 5,163,340 A | 11/1992 | Bender |
| 5,167,508 A | 12/1992 | Mc Taggart |
| 5,174,759 A | 12/1992 | Preston et al. |
| 5,209,665 A | 5/1993 | Billings et al. |
| 5,290,190 A | 3/1994 | McClanahan |
| 5,355,162 A | 10/1994 | Yazolino et al. |
| 5,407,357 A | 4/1995 | Cutler |
| 5,452,023 A | 9/1995 | Kim |
| 5,467,384 A | 11/1995 | Skinner, Sr. |
| 5,475,835 A | 12/1995 | Hickey |
| 5,493,329 A | 2/1996 | Ohguchi |
| 5,512,935 A | 4/1996 | Majeti et al. |
| 5,532,748 A | 7/1996 | Naimpally |
| 5,541,917 A | 7/1996 | Farris |
| 5,574,964 A | 11/1996 | Hamlin |
| 5,577,735 A | 11/1996 | Reed et al. |
| 5,583,561 A | 12/1996 | Baker et al. |
| 5,589,892 A | 12/1996 | Knee et al. |
| 5,592,477 A | 1/1997 | Farris et al. |
| 5,600,364 A | 2/1997 | Hendricks et al. |
| 5,610,916 A | 3/1997 | Kostreski et al. |
| 5,613,012 A | 3/1997 | Hoffman et al. |
| 5,629,868 A | 5/1997 | Tessier et al. |
| 5,630,757 A | 5/1997 | Gagin et al. |
| 5,644,354 A | 7/1997 | Thompson et al. |
| 5,650,831 A | 7/1997 | Farwell |
| 5,651,332 A | 7/1997 | Moore et al. |
| 5,654,746 A | 8/1997 | McMullan, Jr. et al. |
| 5,656,898 A | 8/1997 | Kalina |
| 5,675,390 A | 10/1997 | Schindler et al. |
| 5,694,138 A | 12/1997 | Crosby |
| 5,708,961 A | 1/1998 | Hylton et al. |
| 5,722,041 A | 2/1998 | Freadman |
| 5,724,106 A | 3/1998 | Autry et al. |
| 5,729,825 A | 3/1998 | Kostreski et al. |
| 5,734,853 A | 3/1998 | Hendricks et al. |
| 5,740,246 A | 4/1998 | Saito |
| 5,752,160 A | 5/1998 | Dunn |
| 5,768,539 A | 6/1998 | Metz et al. |
| 5,774,357 A | 6/1998 | Hoffberg et al. |
| 5,786,845 A | 7/1998 | Tsuria |
| 5,793,438 A | 8/1998 | Bedard |
| 5,793,895 A | 8/1998 | Chang et al. |
| 5,805,719 A | 9/1998 | Pare, Jr. et al. |
| 5,812,929 A | 9/1998 | Tsutsui et al. |
| 5,818,438 A | 10/1998 | Howe et al. |
| 5,828,403 A | 10/1998 | DeRodeff et al. |
| 5,838,384 A | 11/1998 | Schindler et al. |
| 5,838,812 A | 11/1998 | Pare, Jr. et al. |
| 5,864,757 A | 1/1999 | Parker |
| 5,867,223 A | 2/1999 | Schindler et al. |
| 5,892,508 A | 4/1999 | Howe et al. |
| 5,898,826 A | 4/1999 | Pierce et al. |
| 5,900,867 A | 5/1999 | Schindler et al. |
| 5,905,942 A | 5/1999 | Stoel et al. |
| 5,910,970 A | 6/1999 | Lu |
| 5,916,024 A | 6/1999 | Von Kohorn |
| 5,933,498 A | 8/1999 | Schneck et al. |
| 5,940,391 A | 8/1999 | Malkin et al. |
| 5,941,955 A | 8/1999 | Wilby et al. |
| 5,953,318 A | 9/1999 | Nattkemper et al. |
| 5,956,024 A | 9/1999 | Strickland et al. |
| 5,956,081 A | 9/1999 | Katz et al. |
| 5,956,716 A | 9/1999 | Kenner et al. |
| 5,970,088 A | 10/1999 | Chen |
| 5,987,061 A | 11/1999 | Chen |
| 5,990,927 A | 11/1999 | Hendricks et al. |
| 5,995,155 A | 11/1999 | Schindler et al. |
| 5,999,518 A | 12/1999 | Nattkemper et al. |
| 5,999,563 A | 12/1999 | Polley et al. |
| 6,002,722 A | 12/1999 | Wu |
| 6,005,561 A | 12/1999 | Hawkins et al. |
| 6,005,861 A | 12/1999 | Humpleman |
| 6,014,184 A | 1/2000 | Knee et al. |
| 6,021,158 A | 2/2000 | Schurr et al. |
| 6,021,167 A | 2/2000 | Wu |
| 6,026,164 A | 2/2000 | Sakamoto et al. |
| 6,028,600 A | 2/2000 | Rosin et al. |
| 6,029,045 A | 2/2000 | Picco et al. |
| 6,029,046 A | 2/2000 | Khan et al. |
| 6,038,251 A | 3/2000 | Chen |
| 6,038,257 A | 3/2000 | Brusewitz et al. |
| 6,044,107 A | 3/2000 | Gatherer et al. |
| 6,052,120 A | 4/2000 | Nahi et al. |
| 6,055,268 A | 4/2000 | Timm et al. |
| 6,072,483 A | 6/2000 | Rosin et al. |
| 6,084,584 A | 7/2000 | Nahi et al. |
| 6,091,930 A | 7/2000 | Mortimer et al. |
| 6,111,582 A | 8/2000 | Jenkins |
| 6,118,498 A | 9/2000 | Reitmeier |
| 6,122,660 A | 9/2000 | Baransky et al. |
| 6,124,799 A | 9/2000 | Parker |
| 6,127,941 A | 10/2000 | Van Ryzin |
| 6,133,910 A | 10/2000 | Stinebruner |
| 6,137,839 A | 10/2000 | Mannering et al. |
| 6,166,734 A | 12/2000 | Nahi et al. |
| 6,181,335 B1 | 1/2001 | Hendricks et al. |
| 6,192,282 B1 | 2/2001 | Smith et al. |
| 6,195,680 B1 | 2/2001 | Goldszmidt et al. |
| 6,195,692 B1 | 2/2001 | Hsu |
| 6,202,211 B1 | 3/2001 | Williams, Jr. |
| 6,215,483 B1 | 4/2001 | Zigmond |
| 6,222,308 B1 | 4/2001 | Ozawa et al. |
| 6,237,022 B1 | 5/2001 | Bruck et al. |
| 6,243,366 B1 | 6/2001 | Bradley et al. |
| 6,252,588 B1 | 6/2001 | Dawson |
| 6,252,989 B1 | 6/2001 | Geisler et al. |
| 6,253,231 B1 | 6/2001 | Fujii |
| 6,260,192 B1 | 7/2001 | Rosin et al. |
| 6,269,394 B1 | 7/2001 | Kenner et al. |
| 6,275,268 B1 | 8/2001 | Ellis et al. |
| 6,275,989 B1 | 8/2001 | Broadwin et al. |
| 6,281,813 B1 | 8/2001 | Vierthaler et al. |
| 6,286,142 B1 | 9/2001 | Ehreth |
| 6,295,057 B1 | 9/2001 | Rosin et al. |
| 6,300,962 B1 | 10/2001 | Wishoff et al. |
| 6,311,214 B1 | 10/2001 | Rhoads |
| 6,314,409 B2 | 11/2001 | Schneck et al. |
| 6,317,884 B1 | 11/2001 | Eames et al. |
| 6,327,000 B1 | 12/2001 | Auld et al. |
| 6,344,882 B1 | 2/2002 | Shim et al. |
| 6,357,043 B1 | 3/2002 | Ellis et al. |
| 6,359,636 B1 | 3/2002 | Schindler et al. |
| 6,359,661 B1 | 3/2002 | Nickum |
| 6,363,149 B1 | 3/2002 | Candelore |
| 6,385,693 B1 | 5/2002 | Gerszberg et al. |
| 6,396,480 B1 | 5/2002 | Schindler et al. |
| 6,396,531 B1 | 5/2002 | Gerszberg et al. |
| 6,396,544 B1 | 5/2002 | Schindler et al. |
| 6,397,387 B1 | 5/2002 | Rosin et al. |
| 6,400,407 B1 | 6/2002 | Zigmond et al. |
| 6,411,307 B1 | 6/2002 | Rosin et al. |
| 6,414,725 B1 | 7/2002 | Clarin et al. |
| 6,418,149 B1 | 7/2002 | Swisher et al. |
| 6,430,233 B1 | 8/2002 | Dillon et al. |
| 6,442,285 B2 | 8/2002 | Rhoads et al. |
| 6,442,549 B1 | 8/2002 | Schneider |
| 6,449,601 B1 | 9/2002 | Friedland et al. |
| 6,450,407 B1 | 9/2002 | Freeman et al. |
| 6,460,075 B2 | 10/2002 | Krueger et al. |
| 6,463,585 B1 | 10/2002 | Hendricks et al. |
| 6,470,378 B1 | 10/2002 | Tracton et al. |
| 6,481,011 B1 | 11/2002 | Lemmons |
| 6,486,892 B1 | 11/2002 | Stern |
| 6,492,913 B2 | 12/2002 | Vierthaler et al. |
| 6,493,875 B1 | 12/2002 | Eames et al. |
| 6,496,983 B1 | 12/2002 | Schindler et al. |
| 6,502,242 B1 | 12/2002 | Howe et al. |
| 6,505,348 B1 | 1/2003 | Knowles et al. |
| 6,510,519 B2 | 1/2003 | Wasilewski et al. |
| 6,515,680 B1 | 2/2003 | Hendricks et al. |
| 6,516,467 B1 | 2/2003 | Schindler et al. |
| 6,519,011 B1 | 2/2003 | Shendar |

(56) References Cited

U.S. PATENT DOCUMENTS

| | | |
|---|---|---|
| 6,522,769 B1 | 2/2003 | Rhoads et al. |
| 6,525,706 B1 | 2/2003 | Rehkemper et al. |
| 6,526,577 B1 | 2/2003 | Knudson et al. |
| 6,529,949 B1 | 3/2003 | Getsin et al. |
| 6,535,590 B2 | 3/2003 | Tidwell et al. |
| 6,535,717 B1 | 3/2003 | Matsushima et al. |
| 6,536,590 B1 | 3/2003 | Godshaw et al. |
| 6,538,704 B1 | 3/2003 | Grabb et al. |
| 6,542,500 B1 | 4/2003 | Gerszberg et al. |
| 6,542,740 B1 | 4/2003 | Olgaard et al. |
| 6,557,030 B1 | 4/2003 | Hoang |
| 6,563,430 B1 | 5/2003 | Kemink et al. |
| 6,567,982 B1 | 5/2003 | Howe et al. |
| 6,574,083 B1 | 6/2003 | Krass et al. |
| 6,577,595 B1 | 6/2003 | Counterman |
| 6,580,391 B1 | 6/2003 | Kepley et al. |
| 6,587,873 B1 | 7/2003 | Nobakht et al. |
| 6,593,973 B1 | 7/2003 | Sullivan et al. |
| 6,598,231 B1 | 7/2003 | Basawapatna et al. |
| 6,599,199 B1 | 7/2003 | Hapshie |
| 6,601,074 B1 | 7/2003 | Liebenow |
| 6,607,136 B1 | 8/2003 | Atsmon et al. |
| 6,609,253 B1 | 8/2003 | Swix et al. |
| 6,611,537 B1 | 8/2003 | Edens et al. |
| 6,614,987 B1 | 9/2003 | Ismail et al. |
| 6,618,858 B1 | 9/2003 | Gautier |
| 6,622,148 B1 | 9/2003 | Noble et al. |
| 6,622,307 B1 | 9/2003 | Ho |
| 6,622,308 B1 | 9/2003 | Raiser |
| 6,631,523 B1 | 10/2003 | Matthews, III et al. |
| 6,640,239 B1 | 10/2003 | Gidwani |
| 6,643,495 B1 | 11/2003 | Gallery et al. |
| 6,643,684 B1 | 11/2003 | Malkin et al. |
| 6,650,761 B1 | 11/2003 | Rodriguez et al. |
| 6,658,568 B1 | 12/2003 | Ginter et al. |
| 6,678,215 B1 | 1/2004 | Treyz et al. |
| 6,678,733 B1 | 1/2004 | Brown et al. |
| 6,690,392 B1 | 2/2004 | Wugoski |
| 6,693,236 B1 | 2/2004 | Gould et al. |
| 6,701,523 B1 | 3/2004 | Hancock et al. |
| 6,704,931 B1 | 3/2004 | Schaffer et al. |
| 6,714,264 B1 | 3/2004 | Kempisty |
| 6,725,281 B1 | 4/2004 | Zintel et al. |
| 6,731,393 B1 | 5/2004 | Currans et al. |
| 6,732,179 B1 | 5/2004 | Brown et al. |
| 6,745,223 B1 | 6/2004 | Nobakht et al. |
| 6,745,392 B1 | 6/2004 | Basawapatna et al. |
| 6,754,206 B1 | 6/2004 | Nattkemper et al. |
| 6,756,997 B1 | 6/2004 | Ward, III et al. |
| 6,760,918 B2 | 7/2004 | Rodriguez et al. |
| 6,763,226 B1 | 7/2004 | McZeal, Jr. |
| 6,765,557 B1 | 7/2004 | Segal et al. |
| 6,766,305 B1 | 7/2004 | Fucarile et al. |
| 6,769,128 B1 | 7/2004 | Knee et al. |
| 6,771,317 B2 | 8/2004 | Ellis et al. |
| 6,773,344 B1 | 8/2004 | Gabai et al. |
| 6,778,559 B2 | 8/2004 | Hyakutake |
| 6,779,004 B1 | 8/2004 | Zintel |
| 6,781,518 B1 | 8/2004 | Hayes et al. |
| 6,784,804 B1 | 8/2004 | Hayes et al. |
| 6,785,716 B1 | 8/2004 | Nobakht |
| 6,788,709 B1 | 9/2004 | Hyakutake |
| 6,804,824 B1 | 10/2004 | Potrebic et al. |
| 6,826,775 B1 | 11/2004 | Howe et al. |
| 6,828,993 B1 | 12/2004 | Hendricks et al. |
| 6,909,874 B2 | 6/2005 | Holtz et al. |
| 6,938,021 B2 | 8/2005 | Shear et al. |
| 7,913,273 B2 | 3/2011 | Del Beccaro et al. |
| 2001/0011261 A1 | 8/2001 | Mullen-Schultz |
| 2001/0016945 A1 | 8/2001 | Inoue |
| 2001/0016946 A1 | 8/2001 | Inoue |
| 2001/0034664 A1 | 10/2001 | Brunson |
| 2001/0044794 A1 | 11/2001 | Nasr et al. |
| 2001/0048677 A1 | 12/2001 | Boys |
| 2001/0049826 A1 | 12/2001 | Wilf |
| 2001/0054008 A1 | 12/2001 | Miller et al. |
| 2001/0054009 A1 | 12/2001 | Miller et al. |
| 2001/0054067 A1 | 12/2001 | Miller et al. |
| 2001/0056350 A1 | 12/2001 | Calderone et al. |
| 2002/0001303 A1 | 1/2002 | Boys |
| 2002/0001310 A1 | 1/2002 | Mai et al. |
| 2002/0002496 A1 | 1/2002 | Miller et al. |
| 2002/0003166 A1 | 1/2002 | Miller et al. |
| 2002/0007307 A1 | 1/2002 | Miller et al. |
| 2002/0007313 A1 | 1/2002 | Mai et al. |
| 2002/0007485 A1 | 1/2002 | Rodriguez et al. |
| 2002/0010639 A1 | 1/2002 | Howey et al. |
| 2002/0010745 A1 | 1/2002 | Schneider |
| 2002/0010935 A1 | 1/2002 | Sitnik |
| 2002/0016736 A1 | 2/2002 | Cannon et al. |
| 2002/0022963 A1 | 2/2002 | Miller et al. |
| 2002/0022970 A1 | 2/2002 | Noll et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0022995 A1 | 2/2002 | Miller et al. |
| 2002/0023959 A1 | 2/2002 | Miller et al. |
| 2002/0026357 A1 | 2/2002 | Miller et al. |
| 2002/0026358 A1 | 2/2002 | Miller et al. |
| 2002/0026369 A1 | 2/2002 | Miller et al. |
| 2002/0026475 A1 | 2/2002 | Marmor |
| 2002/0029181 A1 | 3/2002 | Miller et al. |
| 2002/0030105 A1 | 3/2002 | Miller et al. |
| 2002/0032603 A1 | 3/2002 | Yeiser |
| 2002/0035404 A1 | 3/2002 | Ficco et al. |
| 2002/0040475 A1 | 4/2002 | Yap et al. |
| 2002/0042915 A1 | 4/2002 | Kubischta et al. |
| 2002/0046093 A1 | 4/2002 | Miller et al. |
| 2002/0049635 A1 | 4/2002 | Mai et al. |
| 2002/0054087 A1 | 5/2002 | Noll et al. |
| 2002/0054750 A1 | 5/2002 | Ficco et al. |
| 2002/0059163 A1 | 5/2002 | Smith |
| 2002/0059425 A1 | 5/2002 | Belfiore et al. |
| 2002/0059599 A1 | 5/2002 | Schein et al. |
| 2002/0065717 A1 | 5/2002 | Miller et al. |
| 2002/0067438 A1 | 6/2002 | Baldock |
| 2002/0069220 A1 | 6/2002 | Tran |
| 2002/0069282 A1 | 6/2002 | Reisman |
| 2002/0069294 A1 | 6/2002 | Herkersdorf et al. |
| 2002/0072970 A1 | 6/2002 | Miller et al. |
| 2002/0078442 A1 | 6/2002 | Reyes et al. |
| 2002/0087964 A1 | 7/2002 | Sullivan |
| 2002/0097261 A1 | 7/2002 | Gottfurcht et al. |
| 2002/0104095 A1 | 8/2002 | Nguyen et al. |
| 2002/0106119 A1 | 8/2002 | Foran et al. |
| 2002/0112239 A1 | 8/2002 | Goldman |
| 2002/0116392 A1 | 8/2002 | McGrath et al. |
| 2002/0118315 A1 | 8/2002 | Hong |
| 2002/0124055 A1 | 9/2002 | Reisman |
| 2002/0128061 A1 | 9/2002 | Blanco |
| 2002/0129094 A1 | 9/2002 | Reisman |
| 2002/0133402 A1 | 9/2002 | Faber et al. |
| 2002/0138840 A1 | 9/2002 | Schein et al. |
| 2002/0152264 A1 | 10/2002 | Yamasaki |
| 2002/0169611 A1 | 11/2002 | Guerra et al. |
| 2002/0170063 A1 | 11/2002 | Ansari et al. |
| 2002/0174430 A1 | 11/2002 | Ellis et al. |
| 2002/0188955 A1 | 12/2002 | Thompson et al. |
| 2002/0193997 A1 | 12/2002 | Fitzpatrick et al. |
| 2002/0194601 A1 | 12/2002 | Perkes et al. |
| 2002/0198874 A1 | 12/2002 | Nasr et al. |
| 2003/0005445 A1 | 1/2003 | Schein et al. |
| 2003/0009771 A1 | 1/2003 | Chang |
| 2003/0012365 A1 | 1/2003 | Goodman |
| 2003/0014750 A1 | 1/2003 | Kamen |
| 2003/0018975 A1 | 1/2003 | Stone |
| 2003/0023435 A1 | 1/2003 | Josephson |
| 2003/0023440 A1 | 1/2003 | Chu |
| 2003/0028872 A1 | 2/2003 | Milovanovic et al. |
| 2003/0028890 A1 | 2/2003 | Swart et al. |
| 2003/0030665 A1 | 2/2003 | Tillmanns |
| 2003/0033416 A1 | 2/2003 | Schwartz |
| 2003/0043915 A1 | 3/2003 | Costa et al. |
| 2003/0046091 A1 | 3/2003 | Arneson et al. |

(56) References Cited

U.S. PATENT DOCUMENTS

| | | |
|---|---|---|
| 2003/0046689 A1 | 3/2003 | Gaos |
| 2003/0056223 A1 | 3/2003 | Costa et al. |
| 2003/0058277 A1 | 3/2003 | Bowman-Amuah |
| 2003/0061611 A1 | 3/2003 | Pendakur |
| 2003/0071792 A1 | 4/2003 | Safadi |
| 2003/0093793 A1 | 5/2003 | Gutta |
| 2003/0095211 A1 | 5/2003 | Nakajima |
| 2003/0097661 A1 | 5/2003 | Li et al. |
| 2003/0100340 A1 | 5/2003 | Cupps et al. |
| 2003/0106069 A1 | 6/2003 | Crinon |
| 2003/0110161 A1 | 6/2003 | Schneider |
| 2003/0110503 A1 | 6/2003 | Perkes |
| 2003/0122698 A1 | 7/2003 | Horie et al. |
| 2003/0126136 A1 | 7/2003 | Omoigui |
| 2003/0135771 A1 | 7/2003 | Cupps et al. |
| 2003/0140343 A1 | 7/2003 | Falvo et al. |
| 2003/0141987 A1 | 7/2003 | Hayes |
| 2003/0142670 A1 | 7/2003 | Gould et al. |
| 2003/0144987 A1 | 7/2003 | Marejka et al. |
| 2003/0145321 A1 | 7/2003 | Bates et al. |
| 2003/0149988 A1 | 8/2003 | Ellis et al. |
| 2003/0149989 A1 | 8/2003 | Hunter et al. |
| 2003/0153353 A1 | 8/2003 | Cupps et al. |
| 2003/0153354 A1 | 8/2003 | Cupps et al. |
| 2003/0156218 A1 | 8/2003 | Laksono |
| 2003/0159026 A1 | 8/2003 | Cupps et al. |
| 2003/0160830 A1 | 8/2003 | DeGross |
| 2003/0163601 A1 | 8/2003 | Cupps et al. |
| 2003/0163666 A1 | 8/2003 | Cupps et al. |
| 2003/0171127 A1 | 9/2003 | White |
| 2003/0172380 A1 | 9/2003 | Kikinis |
| 2003/0182237 A1 | 9/2003 | Costa et al. |
| 2003/0182420 A1 | 9/2003 | Jones et al. |
| 2003/0185232 A1 | 10/2003 | Moore et al. |
| 2003/0187509 A1 | 10/2003 | Lemole, Jr. |
| 2003/0187641 A1 | 10/2003 | Moore et al. |
| 2003/0187646 A1 | 10/2003 | Smyers et al. |
| 2003/0187800 A1 | 10/2003 | Moore et al. |
| 2003/0189509 A1 | 10/2003 | Hayes et al. |
| 2003/0189589 A1 | 10/2003 | LeBlanc et al. |
| 2003/0189666 A1 | 10/2003 | Dabell et al. |
| 2003/0192061 A1 | 10/2003 | Hwangbo et al. |
| 2003/0194141 A1 | 10/2003 | Kortum et al. |
| 2003/0194142 A1 | 10/2003 | Kortum et al. |
| 2003/0208396 A1 | 11/2003 | Miller et al. |
| 2003/0208758 A1 | 11/2003 | Schein et al. |
| 2003/0215011 A1 | 11/2003 | Wang et al. |
| 2003/0220881 A1 | 11/2003 | Pirhonen et al. |
| 2003/0226044 A1 | 12/2003 | T. Cupps et al. |
| 2003/0226145 A1 | 12/2003 | Marsh |
| 2003/0229900 A1 | 12/2003 | Reisman |
| 2004/0003041 A1 | 1/2004 | Moore et al. |
| 2004/0003403 A1 | 1/2004 | Marsh |
| 2004/0003412 A1 | 1/2004 | Halbert |
| 2004/0006769 A1 | 1/2004 | Ansari et al. |
| 2004/0006772 A1 | 1/2004 | Ansari et al. |
| 2004/0010602 A1 | 1/2004 | Van Vleck et al. |
| 2004/0013401 A1 | 1/2004 | Kasutani et al. |
| 2004/0015997 A1 | 1/2004 | Ansari et al. |
| 2004/0030750 A1 | 2/2004 | Moore et al. |
| 2004/0031058 A1 | 2/2004 | Reisman |
| 2004/0031856 A1 | 2/2004 | Atsmon et al. |
| 2004/0034877 A1 | 2/2004 | Nogues |
| 2004/0042479 A1 | 3/2004 | Epstein et al. |
| 2004/0049728 A1 | 3/2004 | Langford |
| 2004/0052242 A1 | 3/2004 | Laturell |
| 2004/0064351 A1 | 4/2004 | Mikurak |
| 2004/0068740 A1 | 4/2004 | Fukuda et al. |
| 2004/0068747 A1 | 4/2004 | Robertson et al. |
| 2004/0068753 A1 | 4/2004 | Robertson et al. |
| 2004/0070491 A1 | 4/2004 | Huang et al. |
| 2004/0073918 A1 | 4/2004 | Ferman et al. |
| 2004/0090391 A1 | 5/2004 | Kondo |
| 2004/0098571 A1 | 5/2004 | Falcon |
| 2004/0100462 A1 | 5/2004 | Soemantri |
| 2004/0107125 A1 | 6/2004 | Guheen et al. |
| 2004/0107439 A1 | 6/2004 | Hassell et al. |
| 2004/0111745 A1 | 6/2004 | Schein et al. |
| 2004/0111756 A1 | 6/2004 | Stuckman et al. |
| 2004/0117813 A1 | 6/2004 | Karaoguz et al. |
| 2004/0117824 A1 | 6/2004 | Karaoguz et al. |
| 2004/0123327 A1 | 6/2004 | Fai Ma et al. |
| 2004/0128342 A1 | 7/2004 | Maes et al. |
| 2004/0139173 A1 | 7/2004 | Karaoguz et al. |
| 2004/0143600 A1 | 7/2004 | Musgrove et al. |
| 2004/0143652 A1 | 7/2004 | Grannan et al. |
| 2004/0148408 A1 | 7/2004 | Nadarajah |
| 2004/0150676 A1 | 8/2004 | Gottfurcht et al. |
| 2004/0150748 A1 | 8/2004 | Phillips et al. |
| 2004/0163134 A1 | 8/2004 | Willis |
| 2004/0172658 A1 | 9/2004 | Rakib et al. |
| 2004/0183839 A1 | 9/2004 | Gottfurcht et al. |
| 2004/0194136 A1 | 9/2004 | Finseth et al. |
| 2004/0198386 A1 | 10/2004 | Dupray |
| 2004/0201600 A1 | 10/2004 | Kakivaya et al. |
| 2004/0205821 A1 | 10/2004 | Yamada et al. |
| 2004/0207765 A1 | 10/2004 | Ku et al. |
| 2004/0210633 A1 | 10/2004 | Brown et al. |
| 2004/0210935 A1 | 10/2004 | Schein et al. |
| 2004/0213271 A1 | 10/2004 | Lovy et al. |
| 2004/0221302 A1 | 11/2004 | Ansari et al. |
| 2004/0223485 A1 | 11/2004 | Arellano et al. |
| 2004/0226035 A1 | 11/2004 | Hauser, Jr. |
| 2004/0226045 A1 | 11/2004 | Nadarajah |
| 2004/0234088 A1 | 11/2004 | McCarty et al. |
| 2004/0239624 A1 | 12/2004 | Ramian |
| 2004/0252119 A1 | 12/2004 | Hunleth et al. |
| 2004/0252120 A1 | 12/2004 | Hunleth et al. |
| 2004/0252769 A1 | 12/2004 | Costa et al. |
| 2004/0252770 A1 | 12/2004 | Costa et al. |
| 2004/0259537 A1 | 12/2004 | Ackley |
| 2004/0260407 A1 | 12/2004 | Wimsatt |
| 2004/0261116 A1 | 12/2004 | McKeown et al. |
| 2004/0267729 A1 | 12/2004 | Swaminathan et al. |
| 2004/0268393 A1 | 12/2004 | Hunleth et al. |
| 2005/0015805 A1 | 1/2005 | Iwamura |
| 2005/0026700 A1 | 2/2005 | Blanco |
| 2005/0027851 A1 | 2/2005 | McKeown et al. |
| 2005/0028208 A1 | 2/2005 | Ellis et al. |
| 2005/0031031 A1 | 2/2005 | Osorio |
| 2005/0038814 A1 | 2/2005 | Iyengar et al. |
| 2005/0044280 A1 | 2/2005 | Reisman |
| 2005/0055724 A1 | 3/2005 | Atad et al. |
| 2005/0062637 A1 | 3/2005 | El Zabadani et al. |
| 2005/0081244 A1 | 4/2005 | Barrett et al. |
| 2005/0083412 A1 | 4/2005 | Murphy |
| 2005/0086706 A1 | 4/2005 | Kasamatsu et al. |
| 2005/0097612 A1 | 5/2005 | Pearson et al. |
| 2005/0123136 A1 | 6/2005 | Shin et al. |
| 2005/0132295 A1 | 6/2005 | Noll et al. |
| 2005/0132414 A1 | 6/2005 | Bentley et al. |
| 2005/0149328 A1 | 7/2005 | Huang et al. |
| 2005/0149654 A1 | 7/2005 | Holloway et al. |
| 2005/0149973 A1 | 7/2005 | Fang |
| 2005/0149988 A1 | 7/2005 | Grannan |
| 2005/0155083 A1 | 7/2005 | Oh et al. |
| 2005/0166253 A1 | 7/2005 | Fairhurst et al. |
| 2005/0168372 A1 | 8/2005 | Hollemans |
| 2005/0190781 A1 | 9/2005 | Green et al. |
| 2005/0195961 A1 | 9/2005 | Pasquale et al. |
| 2005/0204388 A1 | 9/2005 | Knudson et al. |
| 2005/0222820 A1 | 10/2005 | Chung |
| 2005/0251827 A1 | 11/2005 | Ellis et al. |
| 2005/0260551 A1 | 11/2005 | Rubin et al. |
| 2005/0270151 A1 | 12/2005 | Winick |
| 2005/0271363 A1 | 12/2005 | Tanikawa |
| 2005/0273815 A1 | 12/2005 | Orr et al. |
| 2005/0273831 A1 | 12/2005 | Slomovich et al. |
| 2005/0289618 A1 | 12/2005 | Hardin |
| 2006/0022816 A1 | 2/2006 | Yukawa |
| 2006/0026663 A1 | 2/2006 | Kortum et al. |
| 2006/0031873 A1 | 2/2006 | Fahrny et al. |
| 2006/0031888 A1* | 2/2006 | Sparrell ............ 725/78 |
| 2006/0037043 A1 | 2/2006 | Kortum et al. |

(56) References Cited

U.S. PATENT DOCUMENTS

| | | |
|---|---|---|
| 2006/0037083 A1 | 2/2006 | Kortum et al. |
| 2006/0048178 A1 | 3/2006 | Kortum et al. |
| 2006/0053447 A1 | 3/2006 | Krzyzanowski et al. |
| 2006/0068777 A1 | 3/2006 | Sadowsky et al. |
| 2006/0075428 A1 | 4/2006 | Farmer et al. |
| 2006/0077921 A1 | 4/2006 | Radpour |
| 2006/0078309 A1 | 4/2006 | Chen et al. |
| 2006/0085831 A1 | 4/2006 | Jones et al. |
| 2006/0085859 A1 | 4/2006 | Okamoto et al. |
| 2006/0090079 A1 | 4/2006 | Oh et al. |
| 2006/0092323 A1 | 5/2006 | Feeler et al. |
| 2006/0109384 A1* | 5/2006 | Miller-Smith et al. ....... 348/730 |
| 2006/0114360 A1 | 6/2006 | Kortum et al. |
| 2006/0114987 A1 | 6/2006 | Roman |
| 2006/0117347 A1 | 6/2006 | Steading |
| 2006/0117374 A1 | 6/2006 | Kortum et al. |
| 2006/0123445 A1 | 6/2006 | Sullivan et al. |
| 2006/0150237 A1 | 7/2006 | Mesut et al. |
| 2006/0156372 A1 | 7/2006 | Cansler, Jr. et al. |
| 2006/0161953 A1 | 7/2006 | Walter et al. |
| 2006/0168610 A1 | 7/2006 | Noil Williams et al. |
| 2006/0174279 A1 | 8/2006 | Sullivan et al. |
| 2006/0174309 A1 | 8/2006 | Pearson |
| 2006/0179466 A1 | 8/2006 | Pearson et al. |
| 2006/0179468 A1 | 8/2006 | Pearson |
| 2006/0184991 A1 | 8/2006 | Schlamp et al. |
| 2006/0184992 A1 | 8/2006 | Kortum et al. |
| 2006/0190402 A1 | 8/2006 | Patron et al. |
| 2006/0197828 A1 | 9/2006 | Zeng et al. |
| 2006/0200576 A1 | 9/2006 | Pickens et al. |
| 2006/0218590 A1 | 9/2006 | White |
| 2006/0230421 A1 | 10/2006 | Pierce et al. |
| 2006/0236343 A1 | 10/2006 | Chang |
| 2006/0236354 A1 | 10/2006 | Sutardja |
| 2006/0242670 A1 | 10/2006 | Teichner et al. |
| 2006/0268917 A1 | 11/2006 | Nadarajah |
| 2006/0282785 A1 | 12/2006 | McCarthy et al. |
| 2006/0290814 A1 | 12/2006 | Walter |
| 2006/0294553 A1 | 12/2006 | Walter et al. |
| 2006/0294559 A1 | 12/2006 | Ansari et al. |
| 2006/0294561 A1 | 12/2006 | Grannan et al. |
| 2006/0294568 A1 | 12/2006 | Walter |
| 2007/0011133 A1 | 1/2007 | Chang |
| 2007/0011250 A1 | 1/2007 | Kortum et al. |
| 2007/0011702 A1 | 1/2007 | Vaysman |
| 2007/0021211 A1 | 1/2007 | Walter |
| 2007/0025449 A1 | 2/2007 | Van Vleck et al. |
| 2007/0039036 A1 | 2/2007 | Sullivan et al. |
| 2007/0078965 A1 | 4/2007 | Shimamura et al. |
| 2007/0081551 A1 | 4/2007 | Oishi et al. |
| 2007/0098079 A1 | 5/2007 | Boyce et al. |
| 2007/0106941 A1 | 5/2007 | Chen et al. |
| 2007/0107026 A1 | 5/2007 | Sherer et al. |
| 2007/0118857 A1 | 5/2007 | Chen et al. |
| 2007/0150930 A1 | 6/2007 | Koivisto et al. |
| 2007/0190857 A1 | 8/2007 | Galang et al. |
| 2007/0211800 A1 | 9/2007 | Shi et al. |
| 2007/0237219 A1 | 10/2007 | Schoenblum |
| 2008/0279179 A1 | 11/2008 | Baker |

FOREIGN PATENT DOCUMENTS

| | | |
|---|---|---|
| WO | 0160066 A1 | 8/2001 |
| WO | 0217627 A2 | 2/2002 |
| WO | 02058382 A1 | 7/2002 |
| WO | 03003710 A2 | 1/2003 |
| WO | 03025726 A1 | 3/2003 |
| WO | 2004018060 A2 | 3/2004 |
| WO | 2004032514 A1 | 4/2004 |
| WO | 2004062279 A1 | 7/2004 |
| WO | 2005045554 | 5/2005 |

OTHER PUBLICATIONS

Kapinos, S., "Accenda Universal Remote Control Targets Needs of Elderly, Visually Impaired, Physically Challenged . . . and the Rest of Us," Press Release, Dec. 15, 2002, Innotech Systems Inc., Port Jefferson, NY, 4 pages.

* cited by examiner

US 8,839,314 B2

DEVICE, SYSTEM, AND METHOD FOR MANAGING TELEVISION TUNERS

CLAIM OF PRIORITY

The present application claims priority from and is a continuation of U.S. patent application Ser. No. 11/001,676 filed on Dec. 1, 2004, the contents of which are expressly incorporated herein by reference in their entirety.

FIELD OF DISCLOSURE

The present disclosure relates generally to the management of multiple television tuners within a single location.

BACKGROUND

In order to recover television content received from a remote source, a television set top box has a television tuner. Once a particular channel is received (i.e., tuned), a user can watch the content of the channel in real time or a digital video recorder (DVR) within the set top box can record the content of the channel. As a result of this arrangement, there is an assigned tuner for each task that the set top box performs. For example, if a user wishes to watch one channel while recording another channel at the same time, the set top box would require at least two television tuners.

Television tuners are relatively expensive with respect to the total cost of a set top box, so it is beneficial to minimize the number of television tuners. During operation of a set top box, the number of desired actions may exceed the number of tuners required to perform the desired actions. In this event, the set top box will not be able to perform all of the desired actions. If a set top box includes two tuners and both tuners are assigned for use only at a single television, it is relatively easy to indicate to a user that the user's desired actions exceed the capability of the set top box. However, if multiple tuners of a set top box are assigned to different televisions in different rooms and multiple viewers are requesting actions that exceed the tuner imposed limitations of the set top box, there is increased difficulty in resolving tuner conflicts. Further, a typical home can include multiple set top boxes coupled to multiple televisions. Managing the television tuners in this environment has become increasingly difficult.

Accordingly, there is a need for an improved system and method for managing television tuners in a home entertainment system.

DETAILED DESCRIPTION

A device for detecting when a television is in a standby mode is provided. The device includes a housing and a plug receptacle is formed within a surface of the housing. Also, a plug extends from the housing. The device further includes a power detection circuit within the housing. The power detection circuit detects when a television coupled to the device is in a standby mode. In a particular embodiment, the standby mode is a low power mode in which the television is not fully operational. Further, the device includes a cable that extends from the housing. A signal can be sent from the power detection circuit to a set top box via the cable. The signal indicates that the television is in the standby mode. In a particular embodiment, an electrical cord from a television is inserted into the plug receptacle. Moreover, the plug that extends from the housing is coupled to a wall outlet. In a particular embodiment, the cable is a coaxial cable.

In another embodiment, a device for detecting when a television is in a standby mode is provided and includes a housing. A plug receptacle is formed within a surface of the housing. Also, a plug extends from the housing. Further, the device includes an antenna that extends from the housing. A power detection circuit is included within the housing and the power detection circuit can detect when the television is in the standby mode.

In yet another embodiment, a home entertainment system includes a first television tuner and a second television tuner. A processor is coupled to the first television tuner and the second television tuner. Also, a memory device is accessible to the processor and a computer program is embedded within the memory device. In a particular embodiment, the computer program includes instructions to determine whether a second television coupled to a second television tuner is in a standby mode when the first tuner cannot immediately tune to a requested channel at the first television.

In still another embodiment, a set top box for receiving television content is provided and includes a housing. A first television tuner is located within the housing. Further, a power detection module is located within the housing. Particularly, the power detection module detects when a television coupled to the set top box is in a standby mode in which the television is turned off or operating on low power.

Figure 1:
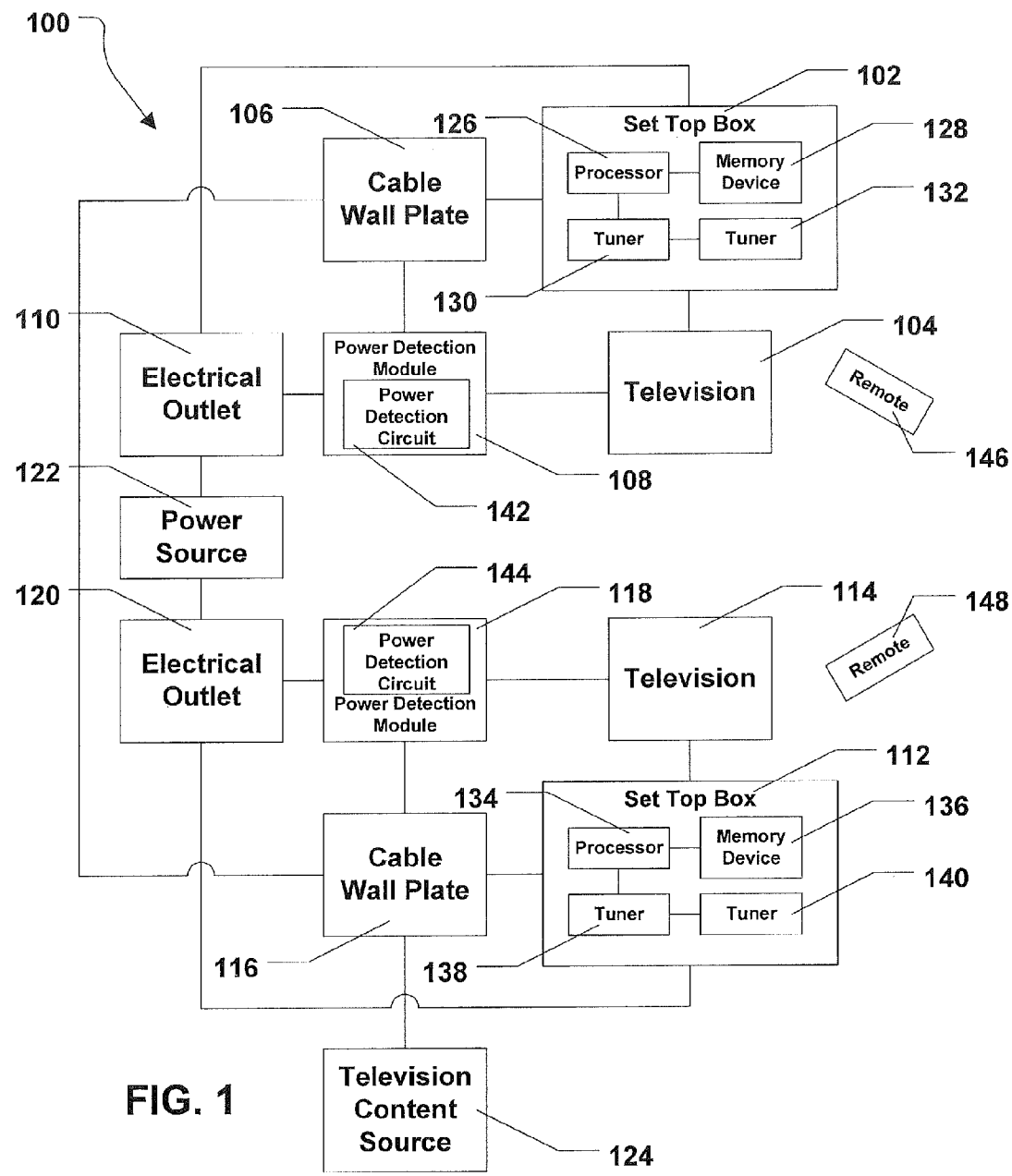
FIG. 1 is a block diagram of a first embodiment of a home entertainment system.

Referring to FIG. 1, a first embodiment of a home entertainment system is shown and is generally designated 100. As illustrated in FIG. 1, the home entertainment system 100 includes a first set top box 102 that is coupled to a first television 104 and to a first cable wall plate 106. FIG. 1 shows that the first television 104 is also coupled to a first power detection module 108 that, in turn, is coupled to an electrical outlet 110. Also, the first power detection module 108 is coupled to the cable wall plate 106. In a particular embodiment, an electrical cord from the first television 104 can be plugged into the first power detection module 108 and the first power detection module 108 can be plugged into the first electrical outlet 110.

FIG. 1 also shows a second set top box 112 that is coupled to a second television 114 and a second coaxial cable wall plate 116. FIG. 1 shows that the second television 114 is also coupled to a power detection module 118. The power detection module 118, in turn, is coupled to an electrical outlet 120. In a particular embodiment, each electrical outlet 110, 120 is a standard 110/120 volt alternating current (VAC) outlet. Moreover, as shown in FIG. 1, each electrical outlet 110, 120 is coupled to a power source 122, e.g., a 110/120 VAC power source. Further, each cable wall plate 106, 116 can include a coaxial cable connection, a category five (CAT-5) connection, a registered jack eleven (RJ-11) type connection, or a combination thereof. Additionally, each cable wall plate 106, 116 can be coupled to each other and to a television content source 124, such as, a digital television content source at a media provider. In a particular embodiment, the television content can be received via a cable network or a digital satellite network.

As depicted in FIG. 1, the first set top box 102 can include a processor 126 and a memory device 128 that is coupled to the processor 126. FIG. 1 further indicates that the first set top box 112 includes a first tuner 130 and a second tuner 132. The second set top box 112 also includes a processor 134 and a memory device 136. Further, the second set top box 112 includes a first tuner 138 and a second tuner 140. In a particular embodiment, within each set top box 102, 112, the processor 126, 134 can access the memory device 128, 136, for example, to write digital television content to and read digital content from the memory device 128, 136. In an illustrative embodiment, each memory device 128, 136 is a flash memory device or any other type of electronically erasable programmable read only memory (EEPROM) device or other non-volatile memory device, such as a hard disk drive. Further, each memory device 128, 136 can be a random access memory (RAM) device. In a particularly embodiment, as indicated in FIG. 1, each set top box 102, 112 includes two television tuners 130, 132, 138, 140, but each set top box 102, 112 can include more television tuners 130, 132, 138, 140. Moreover, although FIG. 1 shows that each set top box 102, 112 includes the same number of television tuners 130, 132, 138, 140 installed therein, this is not a limitation to the home entertainment system 100 shown in FIG. 1.

FIG. 1 indicates that the first power detection module 108 can include a power detection circuit 142. Also, the second power detection module 118 can include a power detection circuit 144. In a particular embodiment, each power detection circuit 142, 144 can detect when a television 104, 114 that is coupled to a power detection module 108, 118 is powered on to an operation mode or is powered down to a standby mode. In the standby mode, the television 104, 114 may receive no power or a minimal amount of power to maintain remote sensing function, clock function, or other functions that require relatively low power. An example of standby mode occurs when the television 104, 114 is turned off, but remains plugged into the electrical outlet 110, 120. In a particular embodiment, the standby mode can also occur when the television receives no power. As such, if the television 104, 114 is unplugged from the power detection module 108, 118, it would appear as if it is in standby mode.

In a particular embodiment, each power detection circuit 142, 144 can determine when a television 104, 114 is turned on or turned off by sensing current or voltage spikes at the power detection circuit 142, 144. Further, in a particular embodiment, each power detection circuit 142, 144 can operate similar to a circuit breaker. For example, when a television 104, 114 is turned on, the current at the power detection circuit 142, 144 will spike. The spike in current can cause a portion of the power detection circuit 142, 144 to move, similar to a switch in a circuit breaker. The movement of that portion of the power detection circuit 142, 144 can open a first portion of the power detection circuit 142, 144 and close a second portion of the power detection circuit 142, 144. A signal can be sent to a set top box 102, 112 that indicates that a television 104, 114 has been turned on. Alternatively, when the television is turned off 104, 114, the first portion of the power detection circuit 142, 144 can close and a signal can be sent to a set top box 102, 112 that indicates that a television 104, 114 has been turned off.

Due to the interconnection between the cable wall plates 106, 116, the power detection modules 108, 118 and the set top boxes 102, 112, the power detection modules 108, 118 can communicate with the set top boxes 102, 112 during the execution of the method described herein. In particular, the power detection modules 108, 118 can send one or signals to the set top boxes 102, 112 indicating when the television 104, 114 coupled thereto is turned on or turned off.

FIG. 1 depicts a first remote control device 146 and a second remote control device 148. In a particular embodiment, the first remote control device 146 can communicate with the first set top box 102 and the first television 104. Also, the second remote control device 148 can communicate with the second set top box 102 and the second television 114. In an illustrative embodiment, the remote control devices 146, 148 can communicate using infrared (IR) signals or radio signals.

Figure 2:
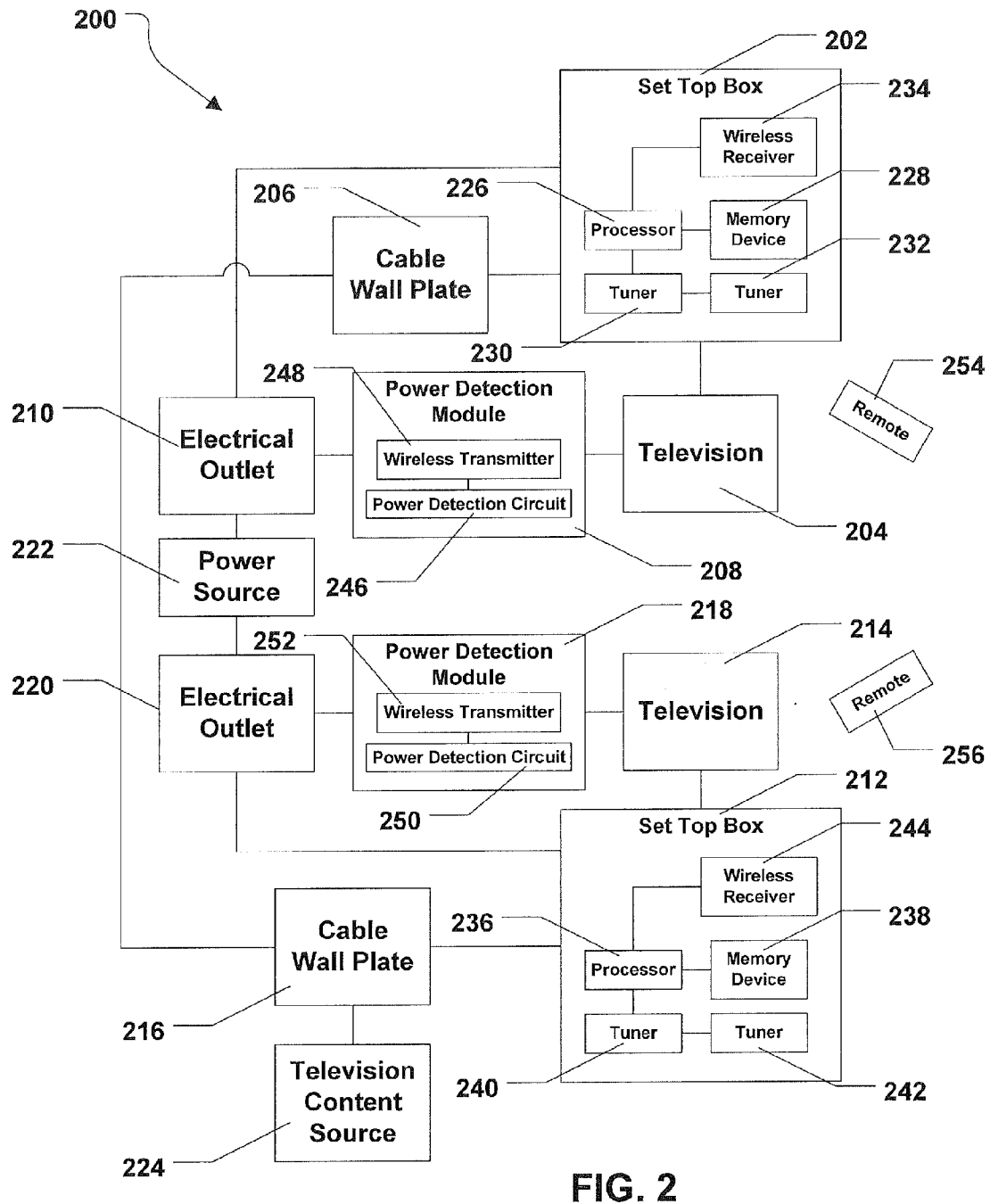
FIG. 2 is a block diagram of a second embodiment of a home entertainment system.

Referring now to FIG. 2, a second embodiment of a home entertainment system is shown and is generally designated 200. As illustrated in FIG. 2, the home entertainment system 200 includes a first set top box 202 that is coupled to a first television 204 and a first cable wall plate 206. FIG. 2 shows that the first television 204 is also coupled to a first power detection module 208 that, in turn, is coupled to an electrical outlet 210. Also, the first power detection module 208 is coupled to the coaxial cable wall plate 206. In a particular embodiment, an electrical cord from the first television 204 can be plugged into the power first power detection module 208 and the first power detection module 208 can be plugged into the first electrical outlet 210.

FIG. 2 also shows a second set top box 212 that is coupled to a second television 214 and a second cable wall plate 216. FIG. 2 shows that the second television 214 is also coupled to a power detection module 218. The power detection module 218, in turn, is coupled to an electrical outlet 220. In a particular embodiment, each electrical outlet 210, 220 is a standard 110/120 volt alternating current (VAC) outlet. Moreover, as shown in FIG. 2, each electrical outlet 210, 220 is coupled to a power source 222, e.g., a 110/120 VAC power source. Further, each cable wall plate 206, 216 can include a coaxial cable connection, a category five (CAT-5) connection, a registered jack eleven (RJ-11) type connection, or a combination thereof. Additionally, each cable wall plate 206, 216 can be coupled to each other and to a television content source 224, e.g., a digital television content source.

As depicted in FIG. 2, the first set top box 202 can include a processor 226 and a memory device 228 that is coupled to the processor 226. FIG. 2 further indicates that the first set top box 202 includes one or more television tuners 230, 232 that are coupled to the processor 226. Additionally, the first set top box 202 can includes a wireless receiver 232 that is also coupled to the processor 226. FIG. 2 indicates that the second set top box 212 can include a processor 236 and a memory device 238 that is coupled to the processor 226. The second set top box 212 also includes one or more television tuners 240, 242 that are coupled to the processor 236.

Within each set top box 202, 212, the processor 226, 236 can access the memory device 228, 238 to read digital television content from or write digital content to the memory device 228, 238. In an illustrative embodiment, each memory device 228, 238 can be a flash memory device or any other type of EEPROM device or non-volatile memory device, such as a hard disk drive. Further, each memory device 228, 238 can be a RAM device.

As illustrated in FIG. 2, the first power detection module 208 can includes a power detection circuit 246 and a wireless transmitter 248. Also, the second power detection module 218 can include a power detection circuit 250 and a wireless transmitter 252. In a particular embodiment, each power detection circuit 246, 250 can detect when a television 204, 214 that is coupled to the power detection module 208, 218 is powered on to an operation mode or is powered down to a standby mode. Further, in a particular embodiment, each wireless transmitter 248, 252 within the power detection modules 208, 218 can communicate with a wireless receiver 234, 244 within the set top boxes 202, 212.

FIG. 2 depicts a first remote control device 254 and a second remote control device 256. Particularly, the first remote control device 254 can communicate with the first set top box 202 and the first television 204. Also, the second remote control device 256 can communicate with the second set top box 212 and the second television 214. In an illustrative embodiment, the remote control devices 254, 256 can communicate using infrared (IR) signals.

Figure 3:
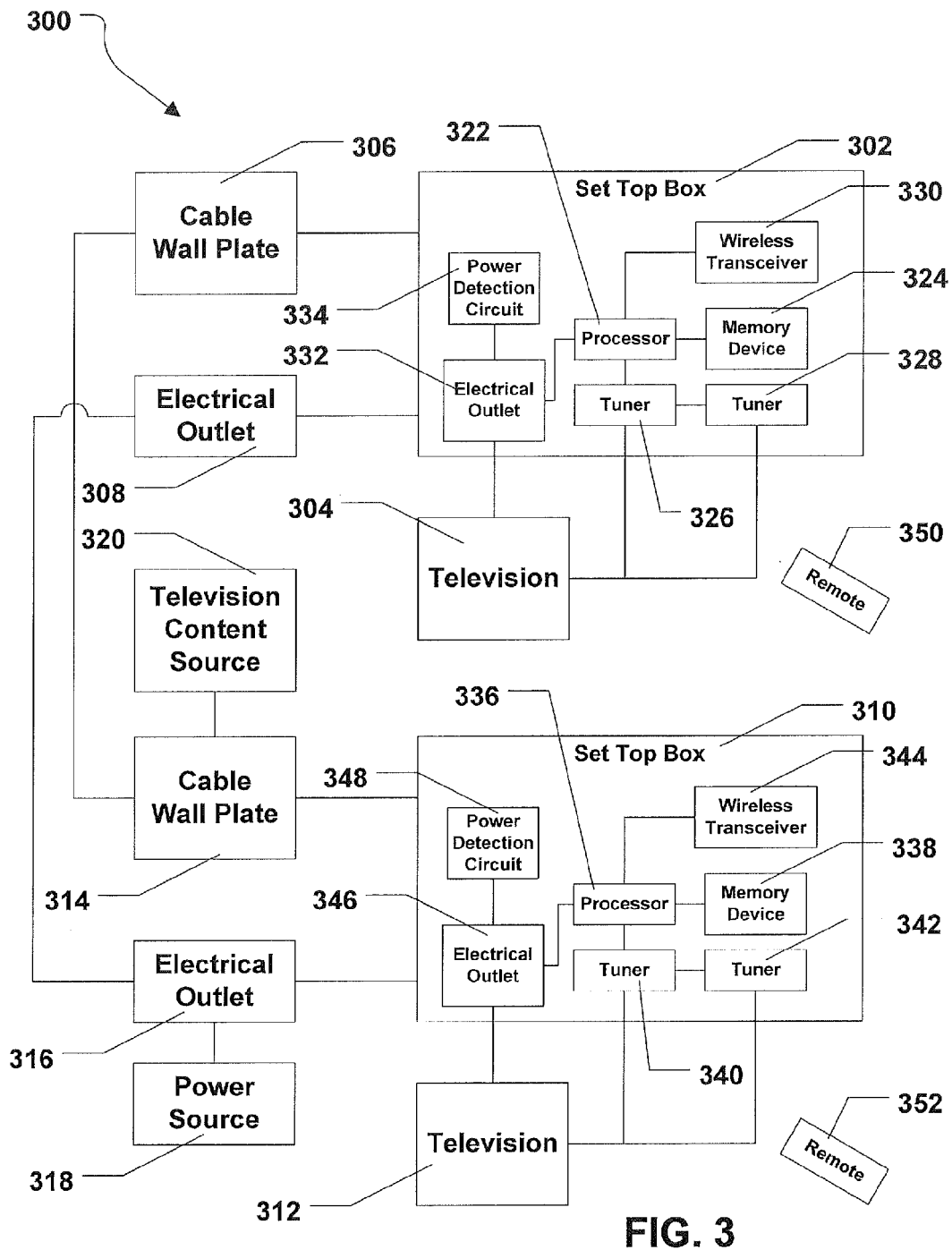
FIG. 3 is a block diagram of a third embodiment of a home entertainment system.

Referring to FIG. 3, a third embodiment of a home entertainment system is shown and is generally designated 300. As illustrated in FIG. 3, the home entertainment system 300 includes a first set top box 302 that is coupled to a first television 304, a first cable wall plate 306, and a first electrical outlet 308.

FIG. 3 also shows a second set top box 310 that is coupled to a second television 312, a second cable wall plate 314, and a second electrical outlet 316. In a particular embodiment, each electrical outlet 308, 316 is a standard 110/120 volt alternating current (VAC) outlet. Moreover, as shown in FIG. 3, each electrical outlet 308, 316 is coupled to a power source 318, e.g., a 110/120 VAC power source. Each cable wall plate 306, 314 can include a coaxial cable connection, a category five (CAT-5) connection, a registered jack eleven (RJ-11) type connection, or a combination thereof. Additionally, each cable wall plate 306, 314 can be coupled to each other and to a television content source 320, e.g., a digital television content source, via a coaxial cable, CAT-5 cable, or a telephone cable.

As depicted in FIG. 3, the first set top box 302 can include a processor 322 and a memory device 324 that is coupled to the processor 322. Also, the first set top box 302 can include one or more television tuners 326, 328 that are coupled to the processor 322. Additionally, the first set top box 302 can include a wireless transceiver 328 that is coupled to the processor 326. As illustrated in FIG. 3, the first set top box 302 also includes an electrical outlet 332 and a power detection circuit 334. In a particular embodiment, a power cord from the first television 304 can be plugged into the electrical outlet 332 at the first set top box 302.

FIG. 3 indicates that the second set top box 310 can include a processor 336 and a memory device 338 that is coupled to the processor 336. Also, the second set top box 310 can include one or more television tuners 340, 342 that are coupled to the processor 336. Additionally, the second set top box 310 can include a wireless transceiver 344 that is coupled to the processor 336. As illustrated in FIG. 3, the second set top box 310 also includes an electrical outlet 346 and a power detection circuit 348. In a particular embodiment, a power cord from the second television 312 can be plugged into the electrical outlet 346 at the first set top box 348.

In a particular embodiment, within each set top box 302, 310, the processor 322, 336 can access the memory device 324, 338, for example, to read television content from and write television content to the memory device 324, 338. Each memory device 324, 338 can be a flash memory device or any other type of EEPROM device or non-volatile memory device, such as a hard disk driver. Also, each memory device 324, 338 can be a RAM device. In a particular embodiment, the set top boxes 302, 210 can communicate with each other via the wireless transceivers 330, 344. Further, each power detection circuit 334, 348 can detect when a television 304, 312 that is receiving power via each set top box 302, 310 is powered on to an operation mode or is powered down to a standby mode.

The set top boxes 302, 310 can communicate with each other in order to manage the tuners 326, 328, 340, 342 based on the demand for the tuners 326, 328, 340, 342 and the availability of the tuners 326, 328, 340, 342. For example, the demand for the tuners 326, 328, 340, 342 can be due to a channel request and a scheduled recording. Further, tuner availability can be determined in part based on an indication that a television 304, 312 coupled to a set top box 302, 310 is in a standby mode.

FIG. 3 also shows a first remote control device 350 and a second remote control device 352. In a particular embodiment, the first remote control device 350 can communicate with the first set top box 302 and the first television 304. Also, the second remote control device 352 can communicate with the second set top box 310 and the second television 312. In an illustrative embodiment, the remote control devices 350, 352 can communicate using infrared (IR) signals.

Figure 4:
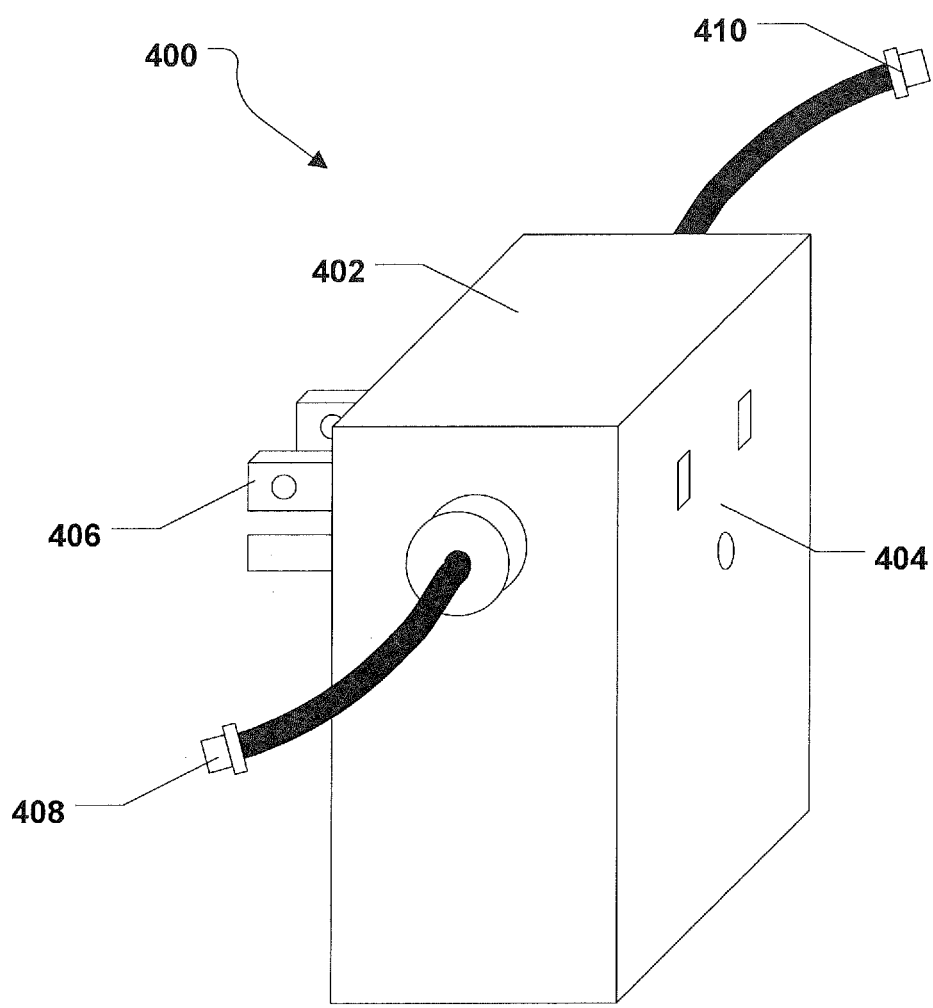
FIG. 4 is a general diagram of a first embodiment of a power detection module.

FIG. 4 shows a first embodiment of a power detection module, designated 400. As illustrated in FIG. 4, the power detection module 400 includes a housing 402. A plug receptacle 404 is foamed in a surface of the housing 402. Moreover, a plug 406 extends from a surface of the housing 402 opposite the plug receptacle 404. FIG. 4 also shows a first cable 408 and a second cable 410 that extend from the housing 402 of the power detection module 400. In a particular embodiment, the plug receptacle 404 is a standard 110/120 Volt AC, three-prong female plug receptacle. Also, the plug 406 is a standard 110/120 Volt AC, three-prong male plug. Further, in a particular embodiment, the cables 408, 410 are coaxial cables, CAT-5 cables, or telephone cables.

In a particular embodiment, the first cable 408 can be coupled to a cable wall outlet and the second cable 410 can be coupled to a set top box. Also, in a particular embodiment, the plug 406 that extends from the power detection module 400 can be plugged into a standard 110/120 Volt AC power outlet. Further, an electrical cord from a television can be inserted into the plug receptacle 404. The power detection module 400 can detect when the television is in an operation mode or in a standby mode and can send a signal of the operation mode or standby mode to a set top box via the first cable 408 or the second cable 410. The signal can be an analog signal or a digital signal.

Figure 5:
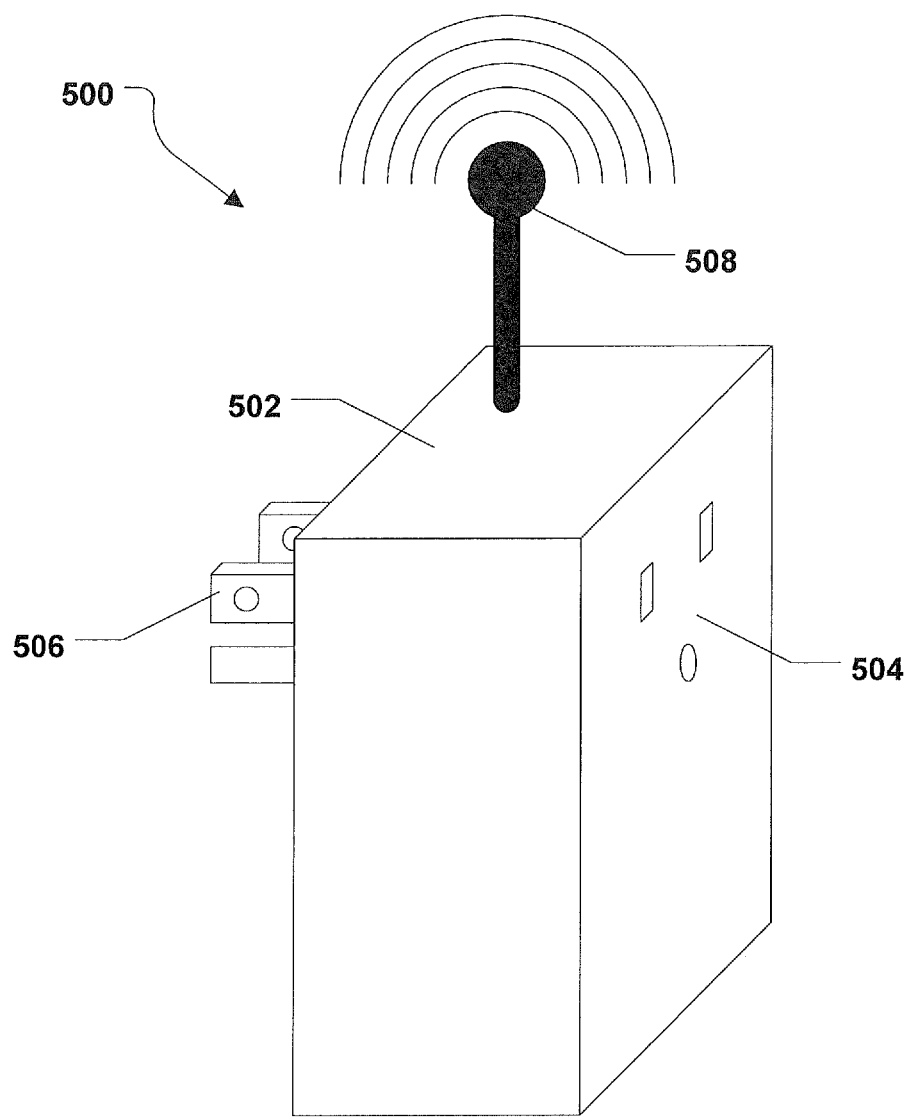
FIG. 5 is a general diagram of a second embodiment power detection module.

Referring to FIG. 5, a second embodiment of a power detection module is illustrated and is generally designated 500. A plug receptacle 504 is formed in a surface of the housing 502. Moreover, a plug 506 extends from a surface of the housing 502 opposite the plug receptacle 504. FIG. 5 also shows a wireless antenna 508 that extends from the housing 502. In a particular embodiment, the plug receptacle 504 is a standard 110/120 Volt AC, three-prong female plug receptacle. Also, the plug 506 is a standard 110/120 Volt AC, three-prong male plug. In a particular embodiment, the wireless antenna 508 is coupled to a wireless transceiver, such as an RF transceiver, a UHF transceiver, or an 802.11 Wi-Fi transceiver.

In a particular embodiment, the plug 506 that extends from the power detection module 500 can be plugged into an AC power outlet. Further, an electrical cord from a television can be inserted in the plug receptacle 504. The power detection module 500 can detect when the television is in an operation mode or in a standby mode and can send a signal that indicates the operation mode or the standby mode to a set top box via the wireless antenna 508.

Figure 6:
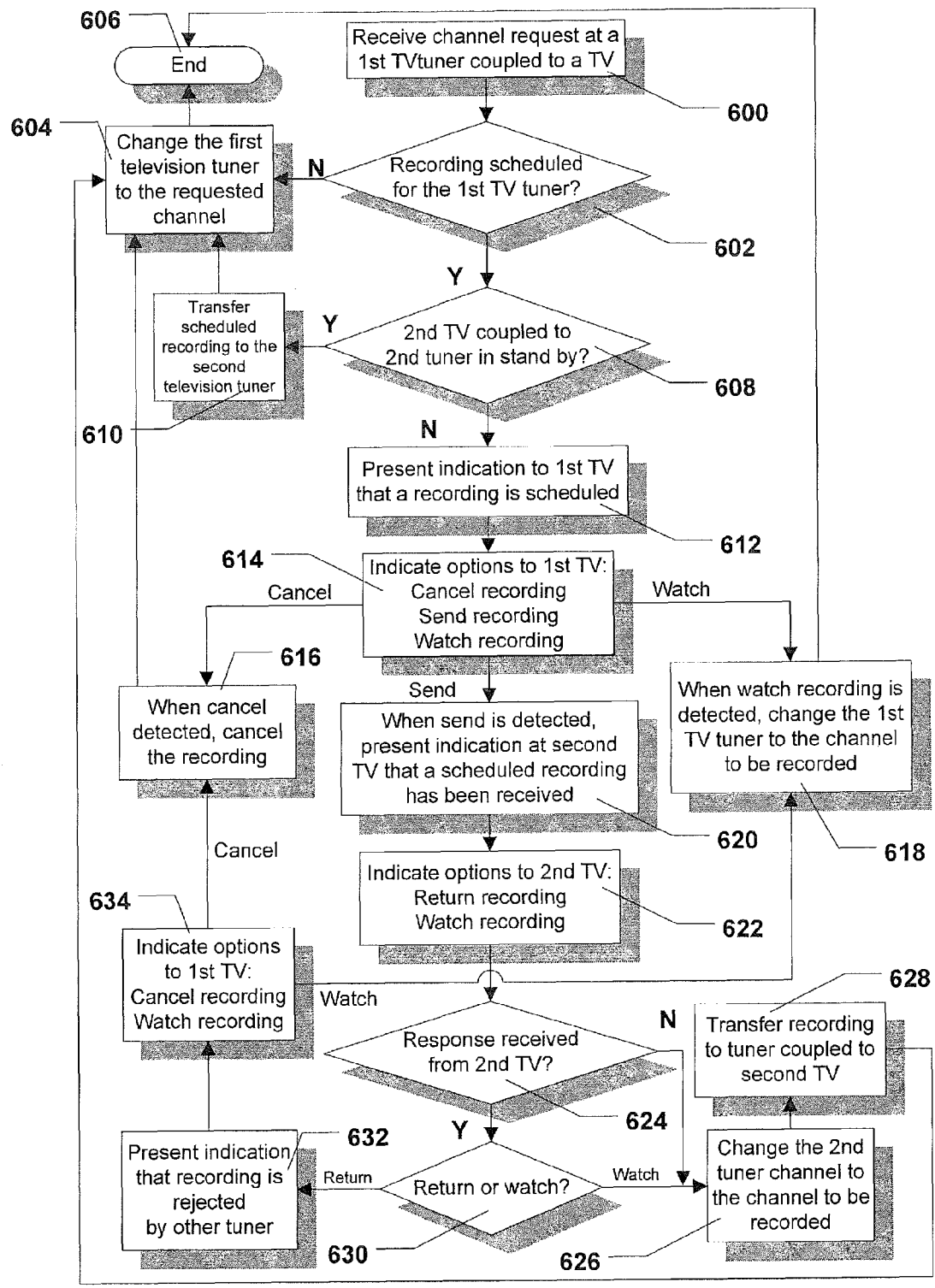
FIG. 6 is a flow chart to illustrate a method of managing multiple tuners in a home entertainment system.

Referring now to FIG. 6, a method of managing multiple tuners in a home entertainment system is shown and commences at block 600 wherein the set top box receives a channel request for a first television tuner coupled to a first television. Next, at block 602, the set top box determines whether a recording is scheduled for the first television tuner. If a recording is not scheduled, the method continues to block 604 and the set top box changes the first television tuner channel to the requested channel. The logic then ends at state 606.

On the other hand, if a recording is scheduled for the first television tuner, the method continues to decision step 608 and the set top box determines whether a second television coupled to a second television tuner is in a standby mode. If the second television is in standby mode, the set top box transfers the scheduled recording originally assigned to the first tuner to the second television tuner at block 610. Next, at block 604, the set top box changes the first television tuner to the requested channel. At decision step 608, if the second television is not in standby mode, the set top box presents an indication, such as a display message, to a user of the first television that a recording is scheduled, at block 612.

Proceeding to block 614, the set top box indicates several options to the user of the first television. In a particular embodiment, the options include: a cancel recording option, a send recording option, and a watch recording option. Further, in a particular embodiment, the options are presented to the user via a graphical user interface presented at the first television. The options are presented via a menu and the user can navigate the menu and select an option using a remote control device. At block 616, when the set top box detects the cancel recording option, the set top box cancels the previously schedule recording. Then, at block 604, the set top box changes the first television tuner to the requested channel. The logic then ends at state 606. At block 618, when the set top box detects the selection of the watch recording option, the set top box changes the first television tuner to the channel to be recorded. The logic then ends at state 606.

Moving to block 620, when the set top box detects the send option, the set top box presents an indication at the second television, e.g., by the displaying a text or graphic message, that a scheduled recording has been transferred to the second television. Thereafter, at block 622, the set top box provides a couple of options to the second television. In a particular embodiment, the options that are indicated to a user of the second television can include a return recording option and a watch recording option. Proceeding to decision step 624, the set top box determines whether a response is received from the second television. If no response is received, indicating that no one is watching the second television, the method continues to block 626 and the set top box changes the second television tuner to the channel associated with the scheduled recording. Thereafter, at block 628, the set top box transfers the scheduled recording to the second television tuner. At block 604, the set top box then changes the first television tuner channel to the requested channel. The method then ends at state 606.

Returning to decision step 624, if the set top box receives a response from the second television, the method moves to decision step 630 and the set top box determines whether the response is the return recording option or the watch recording option. If the set top box receives the watch recording option, the method proceeds to block 626 and the set top box changes the second television tuner to the channel associated with the scheduled recording. Thereafter, at block 628, the set top box transfers the scheduled recording to the second television tuner. Then, at block 604, the set top box changes the first television tuner channel to the requested channel. The method then ends at state 606.

Returning to decision step 630, if the set top box receives the return recording option from the second television, the method continues to block 632 and the set top box presents an indication to the first television that the scheduled recording has been rejected by the second television coupled to the second tuner. Next, at block 634, the set top box presents a couple of options to a user of the first television. In a particular embodiment, the options include a cancel recording option and a watch recording option. Moving to block 616, when the set top box detects the cancel recording option, the set top box cancels the scheduled recording. Then, at block 604, the set top box changes the first tuner to the requested channel. The logic then ends at state 606. On the other hand, at block 618, when the set top box detects the watch recording option, the set top box changes the first television tuner to the channel associated with the scheduled recording. The logic then ends at state 606.

With the configuration of structure described above, the system and method of managing television tuners provides efficient management of television tuner demand based on tuner availability.

The above-disclosed subject matter is to be considered illustrative, and not restrictive, and the appended claims are intended to cover all such modifications, enhancements, and other embodiments. Thus, to the maximum extent allowed by law, the scope is to be deter mined by the broadest permissible interpretation of the following claims and their equivalents, and shall not be restricted or limited by the foregoing detailed description.

What is claimed is:

1. A method comprising:
   at a first set top box:
      transmitting to a second set top box a request to use a television tuner associated with the second set top box;
      receiving a return recording option from the second set top box;
      in response to receiving the return recording option:
         generating an indication of a rejection, wherein the indication includes a graphical message specifying the rejection was caused by the return recording option from the second set top box; and
         displaying the indication at a first display device associated with the first set top box, wherein the indication presents a cancel recording option and a watch recording option;
      receiving an option selection, wherein the option selection indicates the cancel recording option or the watch recording option;
      in response to the option selection indicating the cancel recording option, canceling the request; and
      in response to the option selection indicating the watch recording option, changing a channel associated with a second television tuner associated with the first set top box to a second channel associated with the request.

2. The method of claim 1, further comprising receiving, at the first set top box, a second request to use a first television tuner prior to transmitting the request.

3. The method of claim 2, further comprising determining that a recording is scheduled for a second television tuner associated with the first set top box prior to transmitting the request.

4. The method of claim 3, further comprising determining that a second television associated with the second set top box is not in a standby mode prior to transmitting the request, wherein the determination that the second television is not in the standby mode is based on a signal from a power detection module associated with the second television.

5. The method of claim 1, wherein the return recording option and a watch recording option are presented at a second television associated with the second set top box.

6. An apparatus comprising:
a memory; and
a processor coupled to the memory, the processor configured to perform operations including:
transmitting, from a first set top box to a second set top box, a request to use a television tuner associated with the second set top box;
receiving a return recording option from the second set top box;
generating an indication of a rejection in response to receiving the return recording option, wherein the indication includes a graphical message specifying the rejection was caused by the return recording option from the second set top box;
displaying the indication at a first display device associated with the first set top box, wherein the indication presents a cancel recording option and a watch recording option;
receiving an option selection, wherein the option selection indicates the cancel recording option or the watch recording option;
in response to the option selection indicating the cancel recording option, canceling the request; and
in response to the option selection indicating the watch recording option, changing a channel associated with a second television tuner associated with the first set top box to a second channel associated with the request.

7. The apparatus of claim 6, further comprising a first television interface coupled to the first set top box, wherein the first television interface is configured to send the indication to a first television for display.

8. The apparatus of claim 6, further comprising a power detection module coupled to the first set top box, wherein the power detection module is configured to determine whether a first television associated with the first set top box is in a standby mode.

9. The apparatus of claim 8, wherein the standby mode is a low power mode in which the first television is not fully operational.

10. The apparatus of claim 8, wherein the first television receives no power in the standby mode.

11. The apparatus of claim 6, further comprising a first television tuner coupled to the processor.

12. The apparatus of claim 11, wherein the operations further include determining that a recording is scheduled for the first television tuner prior to transmitting the request to use the television tuner associated with the second set top box.

13. The apparatus of claim 12, wherein the operations further include canceling the scheduled recording in response to receiving the return recording option from the second set top box.

14. A computer readable storage device comprising instructions that, when executed by a processor, cause the processor to perform operations comprising:
transmitting a request to use a television tuner associated with a remote set top box;
receiving a return recording option from the remote set top box;
in response to receiving the return recording option:
generating an indication of a rejection, wherein the indication includes a graphical message specifying the rejection was caused by the return recording option from the second set top box; and
displaying the indication at a first display device associated with the first set top box, wherein the indication presents a cancel recording option and a watch recording option;
receiving an option selection, wherein the option selection indicates the cancel recording option or the watch recording option;
in response to the option selection indicating the cancel recording option, canceling the request; and
in response to the option selection indicating the watch recording option, changing a channel associated with a second television tuner associated with the first set top box to a second channel associated with the request.

15. The computer readable storage device of claim 14, wherein the processor is integrated into a first set top box.

16. The computer readable storage device of claim 14, wherein the operations further comprise determining that a recording is scheduled for a second television tuner associated with a first set top box prior to transmitting the request to use the television tuner associated with the remote set top box.

17. The computer readable storage device of claim 14, wherein the operations further comprise determining that a remote television associated with the remote set top box is not in a standby mode prior to transmitting the request to use the television tuner associated with the remote set top box.

* * * * *